(12) United States Patent
Kamada (10) Patent No.: US 11,364,971 B2
(45) Date of Patent: Jun. 21, 2022

(54) BICYCLE SPROCKET ASSEMBLY AND BICYCLE DRIVE TRAIN

(71) Applicant: SHIMANO INC., Sakai (JP)

(72) Inventor: Kenji Kamada, Sakai (JP)

(73) Assignee: SHIMANO INC., Sakai (JP)

(*) Notice: Subject to any disclaimer, the term of this patent is extended or adjusted under 35 U.S.C. 154(b) by 164 days.

(21) Appl. No.: 15/665,322

(22) Filed: Jul. 31, 2017

(65) Prior Publication Data

US 2019/0031288 A1 Jan. 31, 2019

(51) Int. Cl.
| | |
|---|---|
| B62M 9/1242 | (2010.01) |
| F16H 55/30 | (2006.01) |
| B62M 9/10 | (2006.01) |
| B62M 9/126 | (2010.01) |

(52) U.S. Cl.
CPC ............ *B62M 9/1242* (2013.01); *B62M 9/10* (2013.01); *B62M 9/126* (2013.01); *F16H 55/30* (2013.01)

(58) Field of Classification Search
CPC . B62M 9/10; B62M 9/12; F16D 41/24; F16G 13/06; F16H 9/06
USPC ........................................................ 474/160
See application file for complete search history.

(56) References Cited

U.S. PATENT DOCUMENTS

| | | | | |
|---|---|---|---|---|
| 5,514,042 A * | 5/1996 | Liou | ........................ | B62M 9/10 474/160 |
| 5,954,604 A | 9/1999 | Nakamura | | |
| 7,854,673 B2 * | 12/2010 | Oseto | ........................ | B62M 9/10 403/353 |
| 8,454,461 B2 * | 6/2013 | Valle | ........................ | B62M 9/10 474/69 |
| 8,764,594 B2 * | 7/2014 | Dal Pra' | .................. | F16H 55/30 474/160 |
| 8,821,330 B2 * | 9/2014 | Dal Pra' | ................... | B62M 9/10 474/160 |
| 8,870,692 B2 | 10/2014 | Yamaguchi et al. | | |
| 8,956,254 B2 * | 2/2015 | Tokuyama | ................ | B62M 9/12 474/160 |
| 8,968,130 B2 * | 3/2015 | Liao | ........................ | B62M 9/10 474/160 |
| 9,193,416 B2 * | 11/2015 | Tokuyama | ............... | B62M 9/10 |
| 9,272,750 B2 | 3/2016 | Böhm | | |
| 2009/0042679 A1 * | 2/2009 | Valle | ........................ | B62M 9/10 474/152 |
| 2009/0042680 A1 | 2/2009 | Valle | | |

(Continued)

FOREIGN PATENT DOCUMENTS

| | | |
|---|---|---|
| CN | 102442403 | 5/2012 |
| CN | 105799856 | 7/2016 |
| CN | 106005232 | 10/2016 |

OTHER PUBLICATIONS

Shimano 2015-2016 Spec. Handbook (Year: 2015).*

Primary Examiner — Henry Y Liu
(74) Attorney, Agent, or Firm — Mori & Ward, LLP (57) ABSTRACT

A bicycle sprocket assembly comprises a plurality of sprockets comprising at least twelve sprockets having different numbers of teeth. The at least twelve sprockets are coaxially arranged along a rotational center axis of the bicycle sprocket assembly. An entire gear range of the plurality of sprockets is equal to or larger than 360%. An average percentage gear stage step of the plurality of sprockets being equal to or larger than 10%. The average percentage gear stage step of the plurality of sprockets is smaller than 15%.

21 Claims, 9 Drawing Sheets

(56) References Cited

U.S. PATENT DOCUMENTS

| | | | |
|---|---|---|---|
| 2010/0075791 A1* | 3/2010 | Braedt | B62M 9/10 474/160 |
| 2010/0099530 A1* | 4/2010 | Chiang | B62M 9/10 474/160 |
| 2012/0083371 A1* | 4/2012 | Yamaguchi | B62M 9/126 474/80 |
| 2012/0083372 A1 | 4/2012 | Yamaguchi et al. | |
| 2012/0196711 A1* | 8/2012 | Loy | B62M 9/10 474/160 |
| 2012/0244978 A1* | 9/2012 | Liao | B62M 9/10 474/160 |
| 2012/0277045 A1* | 11/2012 | Valle | B62M 9/10 474/156 |
| 2015/0285363 A1 | 10/2015 | Pfeiffer | |
| 2016/0167737 A1* | 6/2016 | Tokuyama | B62M 9/10 474/160 |
| 2016/0207590 A1* | 7/2016 | Fukumori | F16H 55/30 |
| 2016/0280326 A1* | 9/2016 | Braedt | B25B 27/0071 |
| 2016/0362159 A1 | 12/2016 | Braedt | |
| 2016/0368561 A1 | 12/2016 | Kamada | |
| 2017/0217539 A1* | 8/2017 | Braedt | B62M 9/121 |

\* cited by examiner

| | RS12 | RS11 | RS10 | RS9 | RS8 | RS7 | RS6 | RS5 | RS4 | RS3 | RS2 | RS1 | EGR | APGS |
|---|---|---|---|---|---|---|---|---|---|---|---|---|---|---|
| 1ST | 10 | 12 | 14 | 16 | 18 | 20 | 22 | 24 | 27 | 30 | 33 | 36 | 360% | - |
| | 20.0% | 16.7% | 14.3% | 12.5% | 11.1% | 10.0% | 9.1% | 12.5% | 11.1% | 10.0% | 9.1% | | | 12.4% |
| M1 | 10 | 11 | 12 | 13 | 14 | 16 | 18 | 21 | 24 | 28 | 32 | 36 | 360% | - |
| | 10.0% | 9.1% | 8.3% | 7.7% | 14.3% | 12.5% | 16.7% | 14.3% | 16.7% | 14.3% | 12.5% | | | 12.4% |
| M2 | 10 | 11 | 12 | 14 | 16 | 18 | 21 | 24 | 28 | 32 | 36 | 40 | 400% | - |
| | 10.0% | 9.1% | 16.7% | 14.3% | 12.5% | 16.7% | 14.3% | 16.7% | 14.3% | 12.5% | 11.1% | | | 13.5% |
| M3 | 10 | 12 | 14 | 16 | 18 | 21 | 24 | 27 | 30 | 33 | 36 | 40 | 400% | - |
| | 20.0% | 16.7% | 14.3% | 12.5% | 16.7% | 14.3% | 12.5% | 11.1% | 10.0% | 9.1% | 11.1% | | | 13.5% |
| M4 | 10 | 12 | 14 | 16 | 18 | 20 | 22 | 24 | 28 | 32 | 36 | 40 | 400% | - |
| | 20.0% | 16.7% | 14.3% | 12.5% | 11.1% | 10.0% | 9.1% | 16.7% | 16.7% | 14.3% | 11.1% | | | 13.5% |
| M5 | 10 | 12 | 14 | 16 | 18 | 20 | 22 | 24 | 28 | 32 | 36 | 42 | 420% | - |
| | 20.0% | 16.7% | 14.3% | 12.5% | 11.1% | 10.5% | 9.1% | 16.7% | 14.3% | 12.5% | 16.7% | | | 14.0% |
| M6 | 11 | 13 | 15 | 17 | 19 | 21 | 24 | 27 | 30 | 33 | 36 | 40 | 364% | - |
| | 18.2% | 15.4% | 13.3% | 11.8% | 10.5% | 14.3% | 12.5% | 11.1% | 10.0% | 9.1% | 11.1% | | | 12.5% |
| RE | 11 | 13 | 15 | 17 | 19 | 21 | 23 | 25 | 27 | 30 | 33 | 36 | 327% | - |
| | 18.2% | 15.4% | 13.3% | 11.8% | 10.5% | 9.5% | 8.7% | 8.0% | 11.1% | 10.0% | 9.1% | | | 11.4% |

FIG. 9

BICYCLE SPROCKET ASSEMBLY AND BICYCLE DRIVE TRAIN

BACKGROUND OF THE INVENTION

Field of the Invention

The present invention relates to a bicycle sprocket assembly and a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket assembly comprises a plurality of sprockets comprising at least twelve sprockets having different numbers of teeth. The at least twelve sprockets are coaxially arranged along a rotational center axis of the bicycle sprocket assembly. An entire gear range of the plurality of sprockets is equal to or larger than 360%. An average percentage gear stage step of the plurality of sprockets being equal to or larger than 10%. The average percentage gear stage step of the plurality of sprockets is smaller than 15%.

With the bicycle sprocket assembly according to the first aspect, it is possible to provide the bicycle sprocket assembly having a wide gear range and a well-balanced combination of the plurality of sprockets.

In accordance with a second aspect of the present invention, the bicycle sprocket assembly according to the first aspect is configured so that the average percentage gear stage step of the plurality of sprockets ranges from 12% to 14%.

With the bicycle sprocket assembly according to the second aspect, it is possible to provide the bicycle sprocket assembly having a more well-balanced combination of the plurality of sprockets.

In accordance with a third aspect of the present invention, the bicycle sprocket assembly according to the first or second aspect is configured so that the plurality of sprockets includes a first sprocket. The first sprocket includes a first sprocket body and a plurality of first sprocket teeth extending radially outwardly from the first sprocket body. The plurality of first sprocket teeth includes at least one first tooth and at least one second tooth. The at least one first tooth has a first maximum axial width. The at least one second tooth has a second maximum axial width. The first maximum axial width is larger than the second maximum axial width.

With the bicycle sprocket assembly according to the third aspect, it is possible to improve chain-holding performance of the first sprocket.

In accordance with a fourth aspect of the present invention, the bicycle sprocket assembly according to the first aspect is configured so that the first sprocket has a first pitch circle diameter which is the largest in the plurality of sprockets.

With the bicycle sprocket assembly according to the fourth aspect, it is possible to improve chain-holding performance of the first sprocket having the largest pitch circle diameter.

In accordance with a fifth aspect of the present invention, the bicycle sprocket assembly according to any one of the first to fourth aspects is configured so that the plurality of sprockets includes an interior space. The interior space includes a first end opening and a second end opening. The interior space extends between the first end opening and the second end opening along the rotational center axis.

With the bicycle sprocket assembly according to the fifth aspect, it is possible to save weight of the bicycle sprocket assembly.

In accordance with a sixth aspect of the present invention, the bicycle sprocket assembly according to the fifth aspect is configured so that the first end opening has a first inner diameter. The second end opening has a second inner diameter. The first inner diameter is larger than the second inner diameter.

With the bicycle sprocket assembly according to the sixth aspect, it is possible to effectively save weight of the bicycle sprocket assembly.

In accordance with a seventh aspect of the present invention, the bicycle sprocket assembly according to any one of the first to sixth aspects further comprises a hub engagement member attached to the plurality of sprockets to engage with a bicycle hub assembly. The hub engagement member includes an internal thread configured to engage with an external thread of the bicycle hub assembly.

With the bicycle sprocket assembly according to the seventh aspect, it is possible to easily mount the bicycle sprocket assembly to the bicycle hub assembly.

In accordance with an eighth aspect of the present invention, the bicycle sprocket assembly according to any one of the first to seventh aspects is configured so that the plurality of sprockets includes a smallest sprocket. The smallest sprocket has a pitch circle diameter which is the smallest in the plurality of sprockets, and a total number of teeth equal to or smaller than 10.

With the bicycle sprocket assembly according to the eighth aspect, it is possible to provide the bicycle sprocket assembly having a wider gear range.

In accordance with a ninth aspect of the present invention, the bicycle sprocket assembly according to any one of the first to eighth aspects is configured so that the plurality of sprockets includes a largest sprocket. The largest sprocket has a pitch circle diameter which is the largest in the plurality of sprockets, and a total number of teeth equal to or larger than 36.

With the bicycle sprocket assembly according to the ninth aspect, it is possible to provide the bicycle sprocket assembly having a wider gear range.

In accordance with a tenth aspect of the present invention, a bicycle drive train comprises a bicycle sprocket assembly and a bicycle rear derailleur. The bicycle sprocket assembly comprises a plurality of sprockets comprising at least twelve sprockets having different numbers of teeth. The at least twelve sprockets are coaxially arranged along a rotational center axis of the bicycle sprocket assembly. An entire gear range of the plurality of sprockets is equal to or larger than 360%. An average percentage gear stage step of the plurality of sprockets is equal to or larger than 10%. The average percentage gear stage step of the plurality of sprockets is smaller than 15%. The bicycle rear derailleur comprises a base member, a movable member, a chain guide, and a resistance applying element. The base member is configured to be mounted to a bicycle frame. The movable member is movably coupled to the base member. The chain guide is coupled to the movable member for rotation around a rotational axis of a pivot shaft. The resistance applying element is to apply resistance to a rotational movement of the chain guide.

With the bicycle drive train according to the tenth aspect, it is possible to provide the bicycle drive train including the bicycle sprocket assembly having a wide gear range and a well-balanced combination of the plurality of sprockets.

In accordance with an eleventh aspect of the present invention, the bicycle drive train according to the tenth aspect is configured so that the bicycle rear derailleur further comprises a linkage interconnecting the base member and the movable member to allow a movement of the movable member relative to the base member. The linkage includes a linkage axis oriented orthogonally to a direction parallel to the rotational center axis of the bicycle sprocket assembly.

With the bicycle sprocket assembly according to the eleventh aspect, it is possible to provide the bicycle drive train including the bicycle sprocket assembly having a wide gear range and a well-balanced combination of the plurality of sprockets.

In accordance with a twelfth aspect of the present invention, a bicycle drive train comprises a bicycle rear sprocket assembly and a bicycle crank assembly. The bicycle rear sprocket assembly comprises a plurality of sprockets comprising at least twelve sprockets having different numbers of teeth. The at least twelve sprockets are coaxially arranged along a rotational center axis of the bicycle sprocket assembly. An entire gear range of the plurality of sprockets is equal to or larger than 360%. An average percentage gear stage step of the plurality of sprockets is equal to or larger than 10%. The average percentage gear stage step of the plurality of sprockets is smaller than 15%. The bicycle crank assembly includes a single front sprocket.

With the bicycle sprocket assembly according to the twelfth aspect, it is possible to provide the bicycle drive train including the bicycle sprocket assembly having a wide gear range and a well-balanced combination of the plurality of sprockets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

First Embodiment

Figure 1:
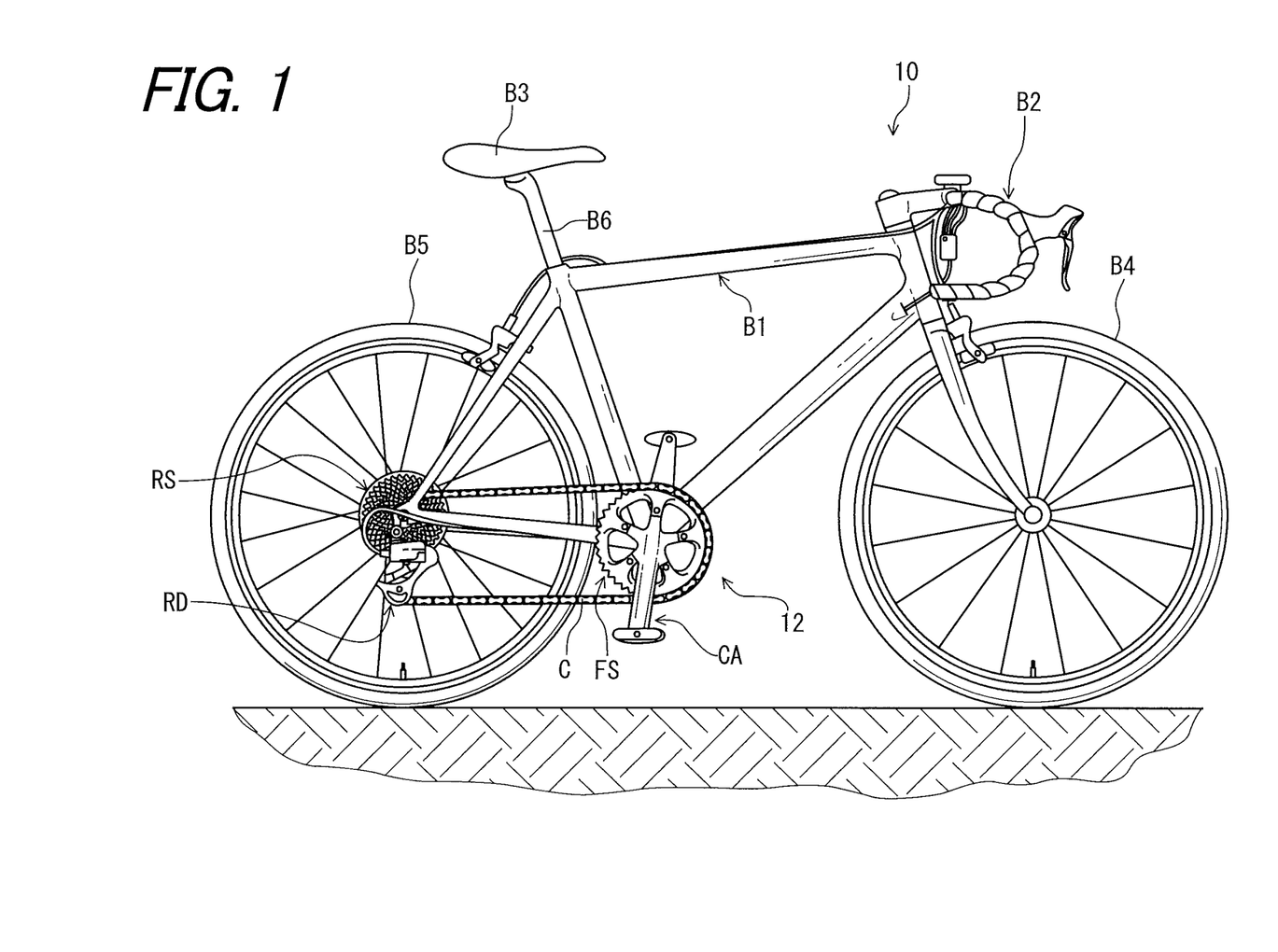
FIG. 1 is a side elevational view of a bicycle including a bicycle drive train in accordance with an embodiment.

Referring initially to FIG. 1, a bicycle 10 includes a bicycle drive train 12 in accordance with a first embodiment. The bicycle 10 further includes a bicycle frame B1, a handlebar B2, a saddle B3, a front wheel B4, and a rear wheel B5. The handlebar B2 is pivotally coupled to the bicycle frame B1. The saddle B3 is attached to a seatpost B6 mounted to the bicycle frame B1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle B3 of the bicycle 10 with facing the handlebar B2. Accordingly, these terms, as utilized to describe the bicycle drive train 12, should be interpreted relative to the bicycle equipped with the bicycle drive train 12 as used in an upright riding position on a horizontal surface.

As seen in FIG. 1, the bicycle drive train 12 comprises a bicycle sprocket assembly RS and a bicycle rear derailleur RD. In this embodiment, the bicycle sprocket assembly RS is a bicycle rear sprocket assembly. The bicycle sprocket assembly RS can also be referred to as a bicycle rear sprocket assembly RS. However, structures of the bicycle sprocket assembly RS can be applied to a front sprocket FS.

The bicycle drive train 12 comprises the bicycle rear sprocket assembly RS and a bicycle crank assembly CA. The bicycle crank assembly CA includes a single front sprocket FS. However, a total number of front sprockets is not limited to this embodiment. In a case where the bicycle crank assembly CA includes a plurality of front sprockets, the bicycle drive train 12 includes a front derailleur.

The bicycle crank assembly CA includes a crank axle and crank arms. The crank arms are secured to the crank axle. The front sprocket FS is secured to at least one of the crank arm and the crank axle to rotate together.

The bicycle drive train 12 comprises a bicycle chain C engaged with the front sprocket FS and the bicycle sprocket assembly RS to transmit a rotational force F1 (FIG. 2) from the front sprocket FS to the bicycle sprocket assembly RS.

Figure 2:
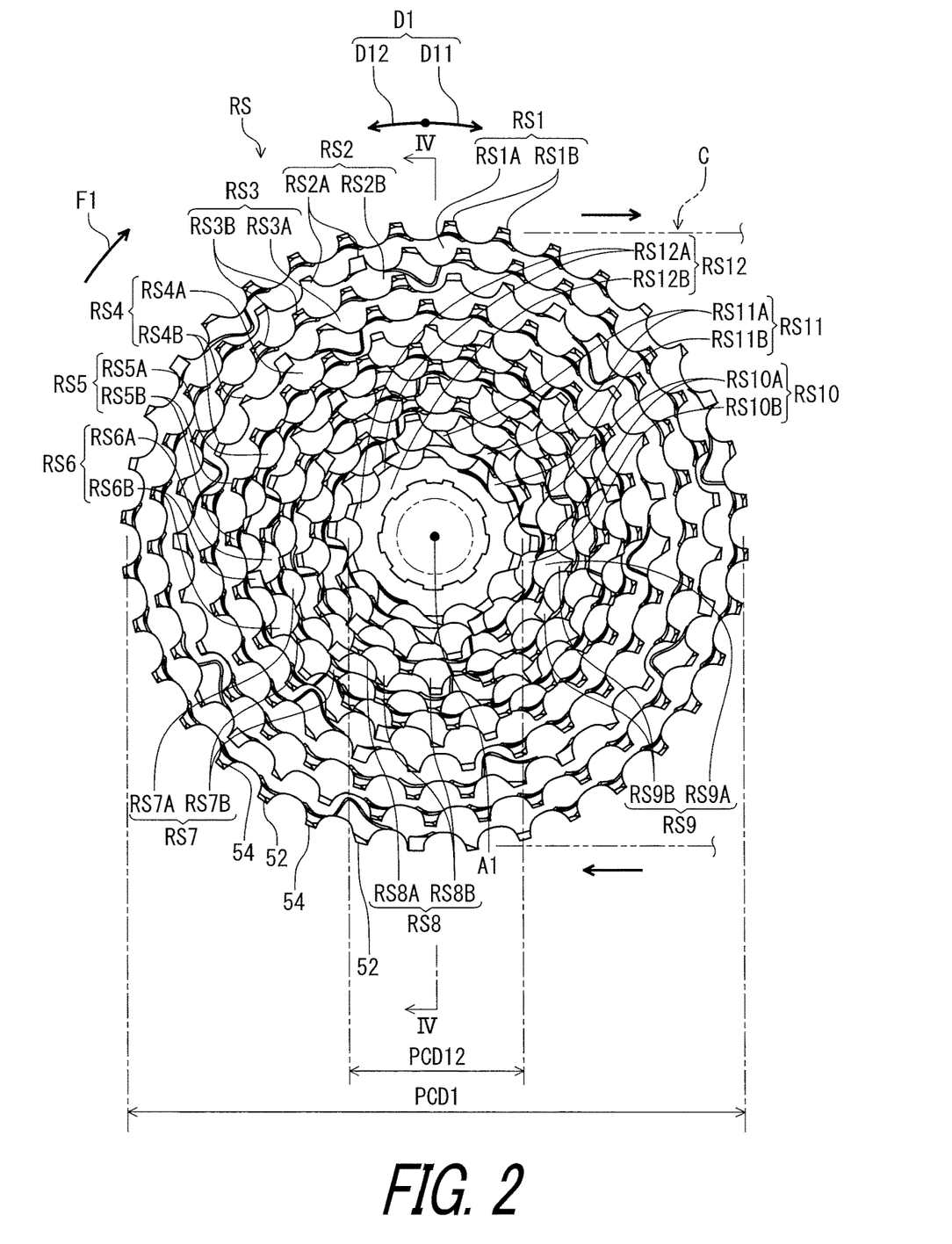
FIG. 2 is a side elevational view of a bicycle sprocket assembly of the bicycle drive train illustrated in FIG. 1.

As seen in FIG. 2, the bicycle sprocket assembly RS has a rotational center axis A1 and is rotatably supported by the bicycle hub assembly 14 relative to the bicycle frame B1 about the rotational center axis A1. The bicycle sprocket assembly RS is rotatable about the rotational center axis A1 in a driving rotational direction D11 during pedaling. A reverse rotational direction D12 is opposite to the driving rotational direction D11. The driving rotational direction D11 and the reverse rotational direction D12 are defined along a circumferential direction D1 of the bicycle sprocket assembly RS. The circumferential direction D1 is defined about the rotational center axis A1 of the bicycle sprocket assembly RS.

The bicycle sprocket assembly RS (the bicycle rear sprocket assembly RS) comprises a plurality of sprockets.

The plurality of sprockets comprises at least twelve sprockets having different numbers of teeth. In this embodiment, the plurality of sprockets includes a largest sprocket RS1. The plurality of sprockets includes a smallest sprocket RS12. Specifically, the plurality of sprockets includes a first sprocket RS1. The plurality of sprockets includes second to twelfth sprockets RS2 to RS12. The first sprocket RS1 corresponds to the largest sprocket in the bicycle sprocket assembly RS. The twelfth sprocket RS12 corresponds to the smallest sprocket RS12 in the bicycle sprocket assembly RS. Thus, the first sprocket RS1 can also be referred to as the largest sprocket RS1, and the twelfth sprocket RS12 can also be referred to as the smallest sprocket RS12. The first to twelfth sprockets RS1 to RS12 can also be referred to as sprockets RS1 to RS12, respectively. A total number of sprockets is not limited to this embodiment.

The first sprocket (the largest sprocket) RS1 includes a first sprocket body RS1A and a plurality of first sprocket teeth RS1B extending radially outwardly from the first sprocket body RS1A. The second sprocket RS2 includes a second sprocket body RS2A and a plurality of second sprocket teeth RS2B extending radially outwardly from the second sprocket body RS2A. The third sprocket RS3 includes a third sprocket body RS3A and a plurality of third sprocket teeth RS3B extending radially outwardly from the third sprocket body RS3A. The fourth sprocket RS4 includes a fourth sprocket body RS4A and a plurality of fourth sprocket teeth RS4B extending radially outwardly from the fourth sprocket body RS4A. The fifth sprocket RS5 includes a fifth sprocket body RS5A and a plurality of fifth sprocket teeth RS5B extending radially outwardly from the fifth sprocket body RS5A. The sixth sprocket RS6 includes a sixth sprocket body RS6A and a plurality of sixth sprocket teeth RS6B extending radially outwardly from the sixth sprocket body RS6A. The seventh sprocket RS7 includes a seventh sprocket body RS7A and a plurality of seventh sprocket teeth RS7B extending radially outwardly from the seventh sprocket body RS7A. The eighth sprocket RS8 includes an eighth sprocket body RS8A and a plurality of eighth sprocket teeth RS8B extending radially outwardly from the eighth sprocket body RS8A. The ninth sprocket RS9 includes a ninth sprocket body RS9A and a plurality of ninth sprocket teeth RS9B extending radially outwardly from the ninth sprocket body RS9A. The tenth sprocket RS10 includes a tenth sprocket body RS10A and a plurality of tenth sprocket teeth RS10B extending radially outwardly from the tenth sprocket body RS10A. The eleventh sprocket RS11 includes an eleventh sprocket body RS11A and a plurality of eleventh sprocket teeth RS11B extending radially outwardly from the eleventh sprocket body RS11A. The twelfth sprocket (the smallest sprocket) RS12 includes a twelfth sprocket body RS12A and a plurality of twelfth sprocket teeth RS12B extending radially outwardly from the twelfth sprocket body RS12A.

In this embodiment, the largest sprocket RS1 has a total number of teeth equal to or larger than 36. The smallest sprocket RS12 has a total number of teeth equal to or smaller than 10. Specifically, a total number of the first sprocket teeth RS1B is 36. A total number of the second sprocket teeth RS2B is 33. A total number of the third sprocket teeth RS3B is 30. A total number of the fourth sprocket teeth RS4B is 27. A total number of the fifth sprocket teeth RS5B is 24. A total number of the sixth sprocket teeth RS6B is 22. A total number of the seventh sprocket teeth RS7B is 20. A total number of the eighth sprocket teeth RS8B is 18. A total number of the ninth sprocket teeth RS9B is 16. A total number of the tenth sprocket teeth RS10B is 14. A total number of the eleventh sprocket teeth RS11B is 12. A total number of the twelfth sprocket teeth RS12B is 10.

The largest sprocket (the first sprocket) RS1 has a pitch circle diameter (first pitch circle diameter) PCD1 which is the largest in the plurality of sprockets RS1 to RS12. The smallest sprocket RS12 has a pitch circle diameter PCD12 which is the smallest in the plurality of sprockets RS1 to RS12. The largest sprocket (the first sprocket) RS1 corresponds to low gear in the bicycle sprocket assembly RS. The smallest sprocket (the twelfth sprocket) RS12 corresponds to top gear in the bicycle sprocket assembly RS.

Figure 3:
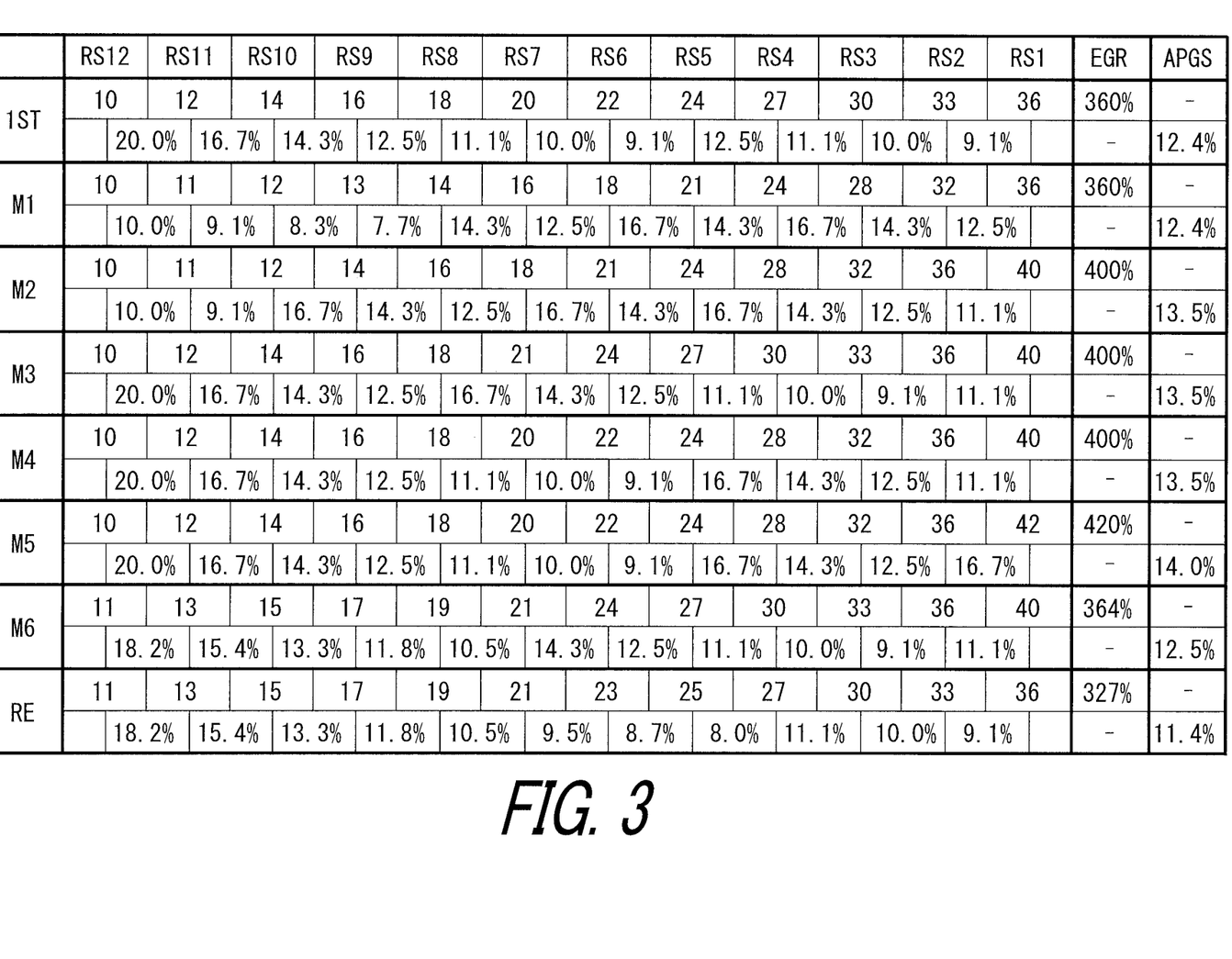
FIG. 3 is a table showing various combinations of sprockets of the bicycle sprocket assembly illustrated in FIG. 2.

As seen in FIG. 3, an entire gear range (EGR) of the plurality of sprockets RS1 to RS12 is equal to or larger than 360%. The entire gear range of the plurality of sprockets RS1 to RS12 is equal to or smaller than 400%. In this embodiment, the entire gear range of the plurality of sprockets RS1 to RS12 is 360%. However, the entire gear range of the plurality of sprockets RS1 to RS12 is not limited to this embodiment and the above ranges.

The entire gear range of the plurality of sprockets RS1 to RS12 is defined as a ratio of the total number of the first sprocket teeth RS1B of the largest sprocket RS1 to the total number of the twelfth sprocket teeth RS12B of the smallest sprocket RS12.

An average percentage gear stage step (APGS) of the plurality of sprockets RS1 to RS12 is equal to or larger than 10%. The average percentage gear stage step of the plurality of sprockets RS1 to RS12 is smaller than 15%. The average percentage gear stage step of the plurality of sprockets RS1 to RS12 preferably ranges from 12% to 14%. The average percentage gear stage step of the plurality of sprockets RS1 to RS12 is 12.4%. However, the average percentage gear stage step of the plurality of sprockets RS1 to RS12 is not limited to this embodiment and the above ranges.

The average percentage gear stage step of the plurality of sprockets RS1 to RS12 is defined as an average of individual percentage gear stage steps of the sprockets RS1 to RS12. The individual percentage gear stage step is defined as a ratio of difference between a total number of teeth of a larger sprocket and a total number of teeth of a smaller sprocket axially directly adjacent to the larger sprocket to the total number of teeth of the smaller sprocket. For example, the individual percentage gear stage step (9.1%) between the sprockets RS1 and RS2 is defined as a ratio of difference (3) between the total tooth number (36) of the sprocket RS1 and the total tooth number (33) of the sprocket RS2 to the total tooth number (33) of the sprocket RS2. However, the average percentage gear stage step is not limited to this embodiment and the above ranges.

As seen in FIG. 3, modifications M1 to M6 can be applied to the bicycle sprocket assembly RS.

In the modification M1, the total numbers of teeth of the first to twelfth sprockets RS1 to RS12 are 10, 11, 12, 13, 14, 16, 18, 21, 24, 28, 32, and 36. The entire gear range of the plurality of sprockets RS1 to RS12 is 360%, and the average percentage gear stage step of the plurality of sprockets RS1 to RS12 is 12.4%.

In the modification M2, the total numbers of teeth of the first to twelfth sprockets RS1 to RS12 are 10, 11, 12, 14, 16, 18, 21, 24, 28, 32, 36, and 40. The entire gear range of the plurality of sprockets RS1 to RS12 is 400%, and the average percentage gear stage step of the plurality of sprockets RS1 to RS12 is 13.5%.

In the modification M3, the total numbers of teeth of the first to twelfth sprockets RS1 to RS12 are 10, 12, 14, 16, 18, 21, 24, 27, 30, 33, 36, and 40. The entire gear range of the plurality of sprockets RS1 to RS12 is 400%, and the average percentage gear stage step of the plurality of sprockets RS1 to RS12 is 13.5%.

In the modification M4, the total numbers of teeth of the first to twelfth sprockets RS1 to RS12 are 10, 12, 14, 16, 18, 20, 22, 24, 28, 32, 36, and 40. The entire gear range of the plurality of sprockets RS1 to RS12 is 400%, and the average percentage gear stage step of the plurality of sprockets RS1 to RS12 is 13.5%.

In the modification M5, the total numbers of teeth of the first to twelfth sprockets RS1 to RS12 are 10, 12, 14, 16, 18, 20, 22, 24, 28, 32, 36, and 42. The entire gear range of the plurality of sprockets RS1 to RS12 is 420%, and the average percentage gear stage step of the plurality of sprockets RS1 to RS12 is 14.0%.

In the modification M6, the total numbers of teeth of the first to twelfth sprockets RS1 to RS12 are 11, 13, 15, 17, 19, 21, 24, 27, 30, 33, 36, and 40. The entire gear range of the plurality of sprockets RS1 to RS12 is 364%, and the average percentage gear stage step of the plurality of sprockets RS1 to RS12 is 12.5%.

In a reference example RE, the total numbers of teeth of the first to twelfth sprockets RS1 to RS12 are 11, 13, 15, 17, 19, 21, 23, 25, 27, 30, 33, and 36. The entire gear range of the plurality of sprockets RS1 to RS12 is 327%, and the average percentage gear stage step of the plurality of sprockets RS1 to RS12 is 11.4%.

Figure 4:
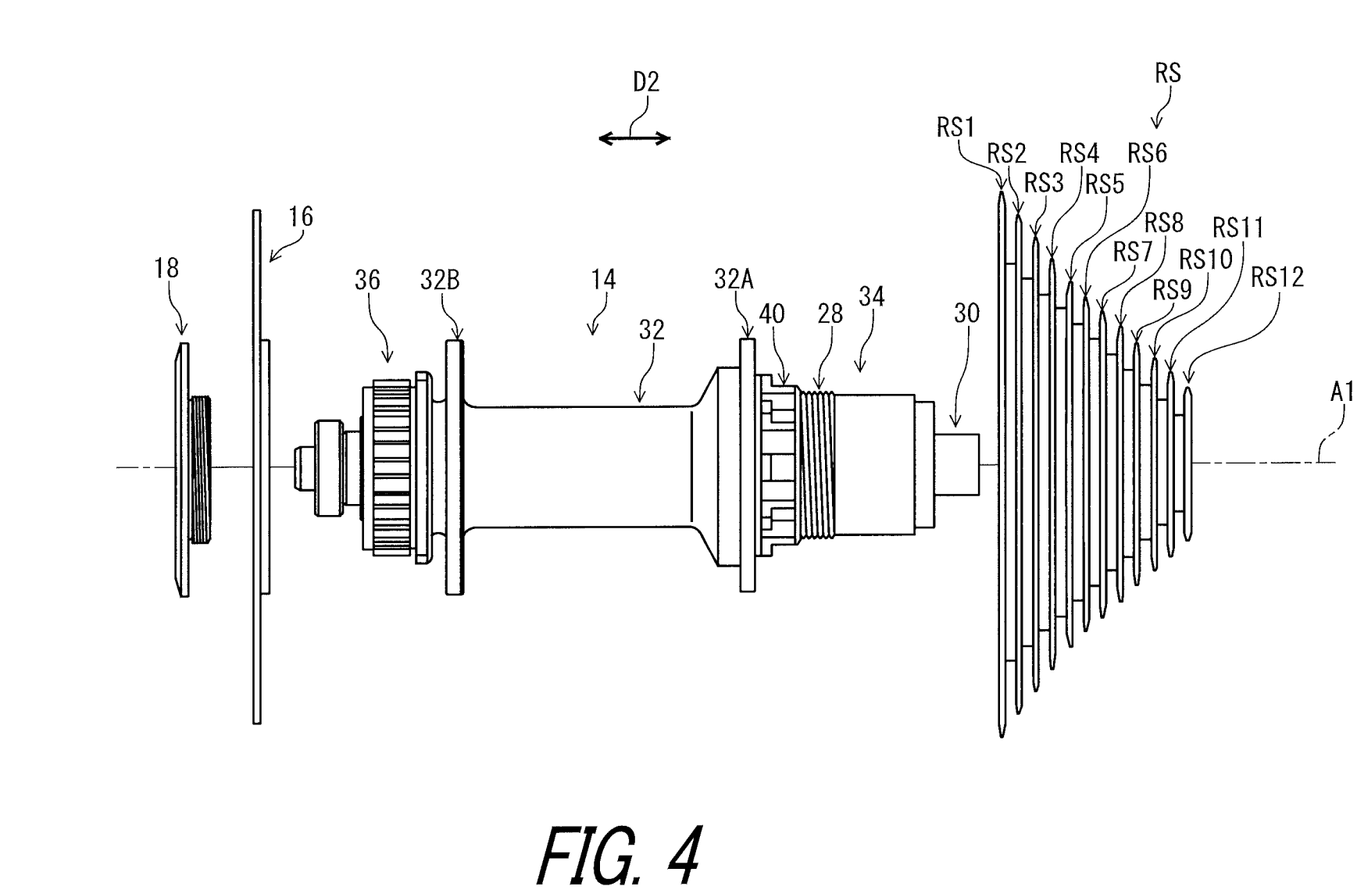
FIG. 4 is a rear view of the bicycle sprocket assembly, a bicycle hub assembly, and a brake rotor of the bicycle drive train illustrated in FIG. 1.

As seen in FIG. 4, the at least twelve sprockets RS1 to RS12 are coaxially arranged along the rotational center axis A1 of the bicycle sprocket assembly RS. The bicycle sprocket assembly RS is mounted to a bicycle hub assembly 14. A brake rotor 16 is secured to the bicycle hub assembly 14 with a rotor lock member 18.

Figure 5:
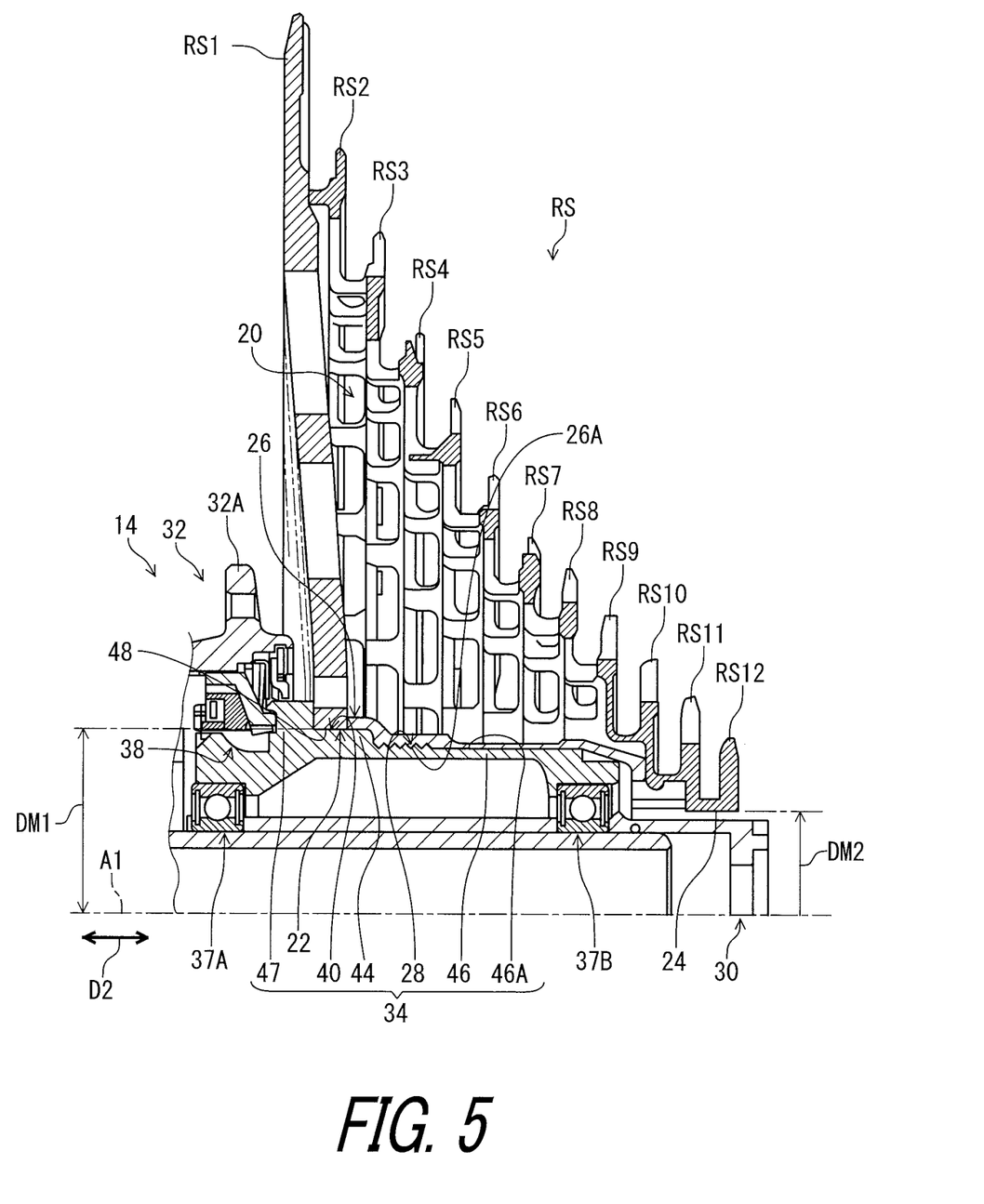
FIG. 5 is a cross-sectional view of the bicycle sprocket assembly and the bicycle hub assembly of the bicycle drive train illustrated in FIG. 1.

As seen in FIG. 5, the plurality of sprockets RS1 to RS12 includes an interior space 20. The interior space 20 includes a first end opening 22 and a second end opening 24. The interior space 20 extends between the first end opening 22 and the second end opening 24 along the rotational center axis A1. The first end opening 22 has a first inner diameter DM1. The second end opening 24 has a second inner diameter DM2. The first inner diameter DM1 is larger than the second inner diameter DM2. However, the first inner diameter DM1 can be equal to or smaller than the second inner diameter DM2.

In this embodiment, the second to twelfth sprockets RS2 to RS12 are integrally provided with each other as a one-piece unitary member. The first sprocket RS1 is a separate member from the second to twelfth sprockets RS2 to RS12 and is secured to the second sprocket RS2 with a plurality of pins (not shown). However, the first sprocket RS1 can be integrally provided with the second sprocket RS2.

In this embodiment, the first sprocket RS1 is made of a metallic material such as iron, aluminum, titanium, and stainless steel. The second to twelfth sprockets RS2 to RS12 are made of a metallic material such as iron, aluminum, titanium, and stainless steel. However, the materials of the first to twelfth sprockets RS1 to RS12 are not limited to this embodiment.

The bicycle sprocket assembly RS further comprises a hub engagement member 26 attached to the plurality of sprockets RS1 to RS12 to engage with the bicycle hub assembly 14. The hub engagement member 26 is rotatably provided between the first sprocket RS1 and the tenth sprocket RS10. The hub engagement member 26 includes an internal thread 26A. The internal thread 26A is configured to engage with an external thread 28 of the bicycle hub assembly 14.

As seen in FIG. 4, the bicycle hub assembly 14 comprises a hub axle 30, a hub body 32, a sprocket support structure 34, and a brake-rotor support structure 36. The hub body 32 is rotatably supported on the hub axle 30 about a rotational center axis A1 of the bicycle hub assembly 14. The hub body 32 has a first body end 32A and a second body end 32B. The second body end 32B is opposite to the first body end 32A in an axial direction D2 with respect to the rotational center axis A1. In this embodiment, the first body end 32A is a right end of the hub body 32, and the second body end 32B is a left end of the hub body 32. However, the first body end 32A can be a left end, and the second body end 32B can be a right end.

The sprocket support structure 34 is configured to support the bicycle sprocket assembly RS. The sprocket support structure 34 is closer to the first body end 32A than the brake-rotor support structure 36 in the axial direction D2. The sprocket support structure 34 is rotatably mounted on the hub axle 30 about the rotational center axis A1. In this embodiment, as seen in FIG. 5, the bicycle hub assembly 14 comprises a first bearing 37A and a second bearing 37B. The first bearing 37A and the second bearing 37B are provided between the sprocket support structure 34 and the hub axle 30 to support rotatably the sprocket support structure 34 relative to the hub axle 30.

As seen in FIG. 4, the brake-rotor support structure 36 is configured to support the brake rotor 16. The brake-rotor support structure 36 is provided at the second body end 32B. The brake-rotor support structure 36 is rotatably mounted on the hub axle 30 about the rotational center axis A1. The brake-rotor support structure 36 is coupled to the hub body 32 to rotate integrally with the hub body 32 relative to the hub axle 30 about the rotational center axis A1. In this embodiment, the brake-rotor support structure 36 is integrally provided with the hub body 32 as a one-piece unitary member. However, the brake-rotor support structure 36 can be a separate member from the hub body 32.

As seen in FIG. 5, the sprocket support structure 34 is a separate member from the hub body 32. The bicycle hub assembly 14 comprises a ratchet structure 38. The sprocket support structure 34 is operatively coupled to the hub body 32 with the ratchet structure 38. The ratchet structure 38 is configured to couple the sprocket support structure 34 to the hub body 32 to rotate the sprocket support structure 34 along with the hub body 32 in one rotational direction during pedaling. The ratchet structure 38 is configured to allow the sprocket support structure 34 to rotate relative to the hub body 32 in the other rotational direction during coasting. The ratchet structure 38 includes structures which have been known in the bicycle field. Thus, they will not be described in detail here for the sake of brevity.

Figure 6:
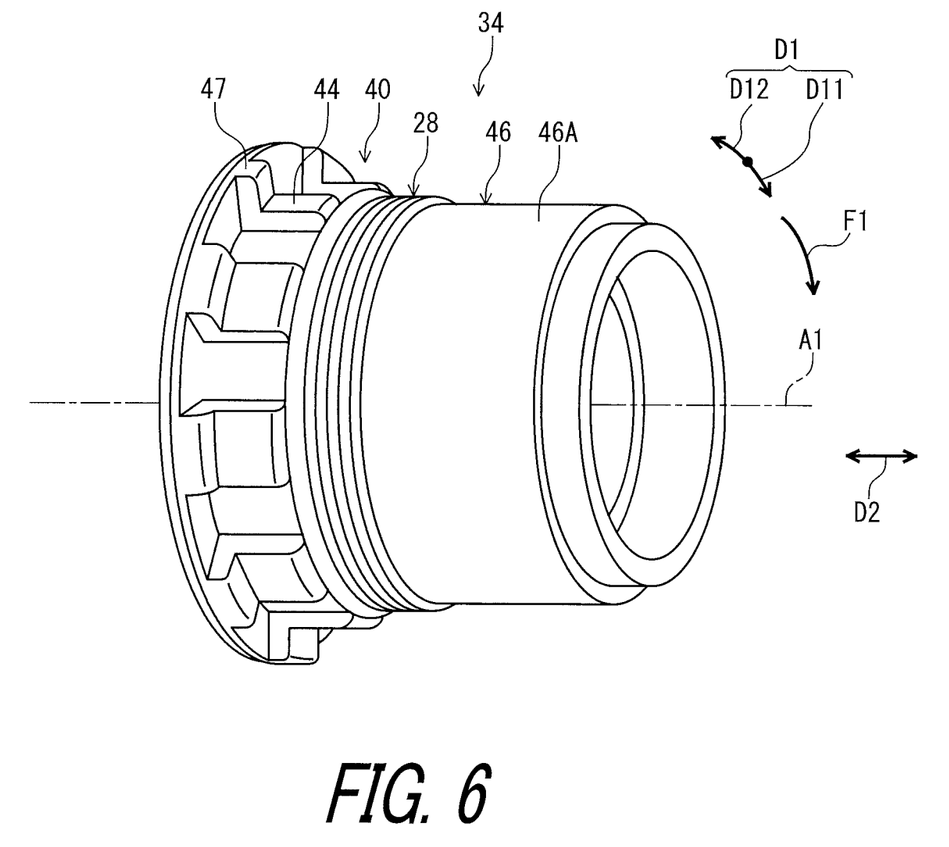
FIG. 6 is a perspective view of a sprocket support structure of the bicycle hub assembly illustrated in FIG. 4.

As seen in FIG. 6, the sprocket support structure 34 includes a first torque-transmitting profile 40 and the external thread 28. The first torque-transmitting profile 40 is configured to transmit the rotational force F1 between the sprocket support structure 34 and the bicycle sprocket assembly RS. The first torque-transmitting profile 40 includes a first splined portion 44. In this embodiment, the sprocket support structure 34 includes a base part 46 having a tubular shape. The first torque-transmitting profile 40 and the external thread 28 are provided on an outer peripheral surface 46A of the base part 46. The sprocket support structure 34 includes a sprocket stopper 47. The first torque-transmitting profile 40 is provided between the external thread 28 and the sprocket stopper 47 in the axial direction D2.

As seen in FIG. 5, the first splined portion 44 is configured to engage with a sprocket splined portion 48 of the bicycle sprocket assembly RS. In this embodiment, the largest sprocket RS1 includes the sprocket splined portion 48.

The sprocket support structure 34 is a separate member from the hub engagement member 26. The external thread 28 is configured to threadedly engage with the internal thread 26A of the hub engagement member 26. The hub engagement member 26 is configured to prevent an axial movement of the bicycle sprocket assembly RS relative to the sprocket support structure 34 in a state where the hub engagement member 26 is attached to the sprocket support structure 34.

The largest sprocket RS1 is provided between the hub engagement member 26 and the sprocket stopper 47 in the axial direction D2 in the state where the hub engagement member 26 is attached to the sprocket support structure 34. The hub engagement member 26 is rotatably coupled to the plurality of sprockets RS1 to RS12. The hub engagement member 26 is coupled to the plurality of sprockets RS1 to RS12 to move integrally with the plurality of sprockets RS1 to RS12 in the axial direction D2. In this embodiment, the bicycle hub assembly 14 comprises the hub engagement member 26. However, the bicycle sprocket assembly RS can include the hub engagement member 26.

As seen in FIG. 2, the plurality of first sprocket teeth RS1B includes at least one first tooth 52 and at least one second tooth 54. In this embodiment, the plurality of first sprocket teeth RS1B includes a plurality of first teeth 52 and a plurality of second teeth 54. The first teeth 52 and the second teeth 54 are alternately arranged in the circumferential direction D1.

Figure 7:
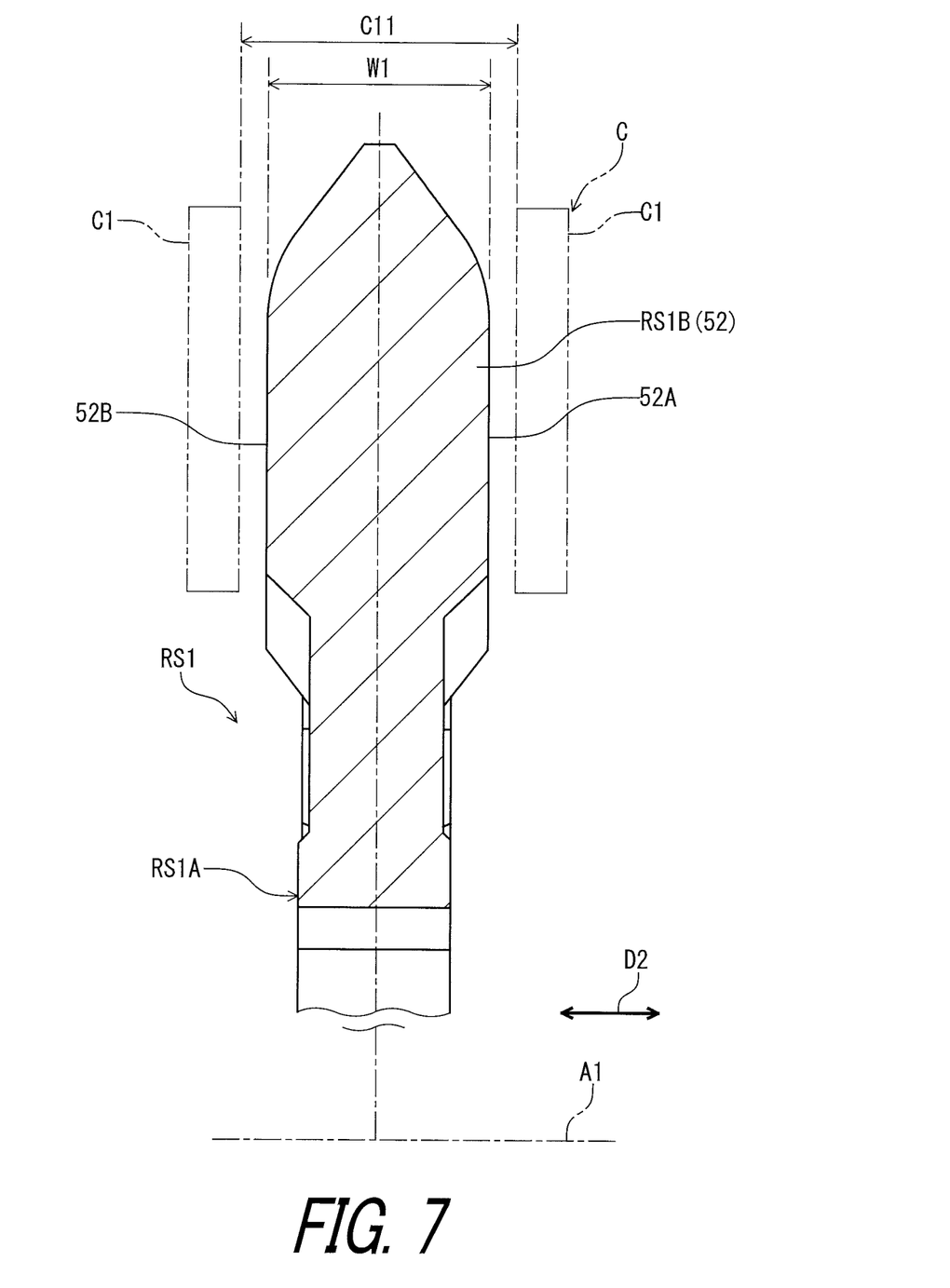
FIG. 7 is a cross-sectional view of a sprocket of the bicycle sprocket assembly illustrated in FIG. 2.

As seen in FIG. 7, the first tooth 52 extends radially outwardly from the first sprocket body RS1A to engage with an outer link space C11 defined between an opposed pair of outer link plates C1 of the bicycle chain C. The at least one first tooth 52 has a first maximum axial width W1. The first maximum axial width W1 is smaller than an axial length of the outer link space C11. The first tooth 52 includes a first axial surface 52A and a first additional axial surface 52B. The first additional axial surface 52B is provided on a reverse side of the first axial surface 52A in the axial direction D2. The first maximum axial width W1 extends from the first axial surface 52A to the first additional axial surface 52B in the axial direction D2.

Figure 8:
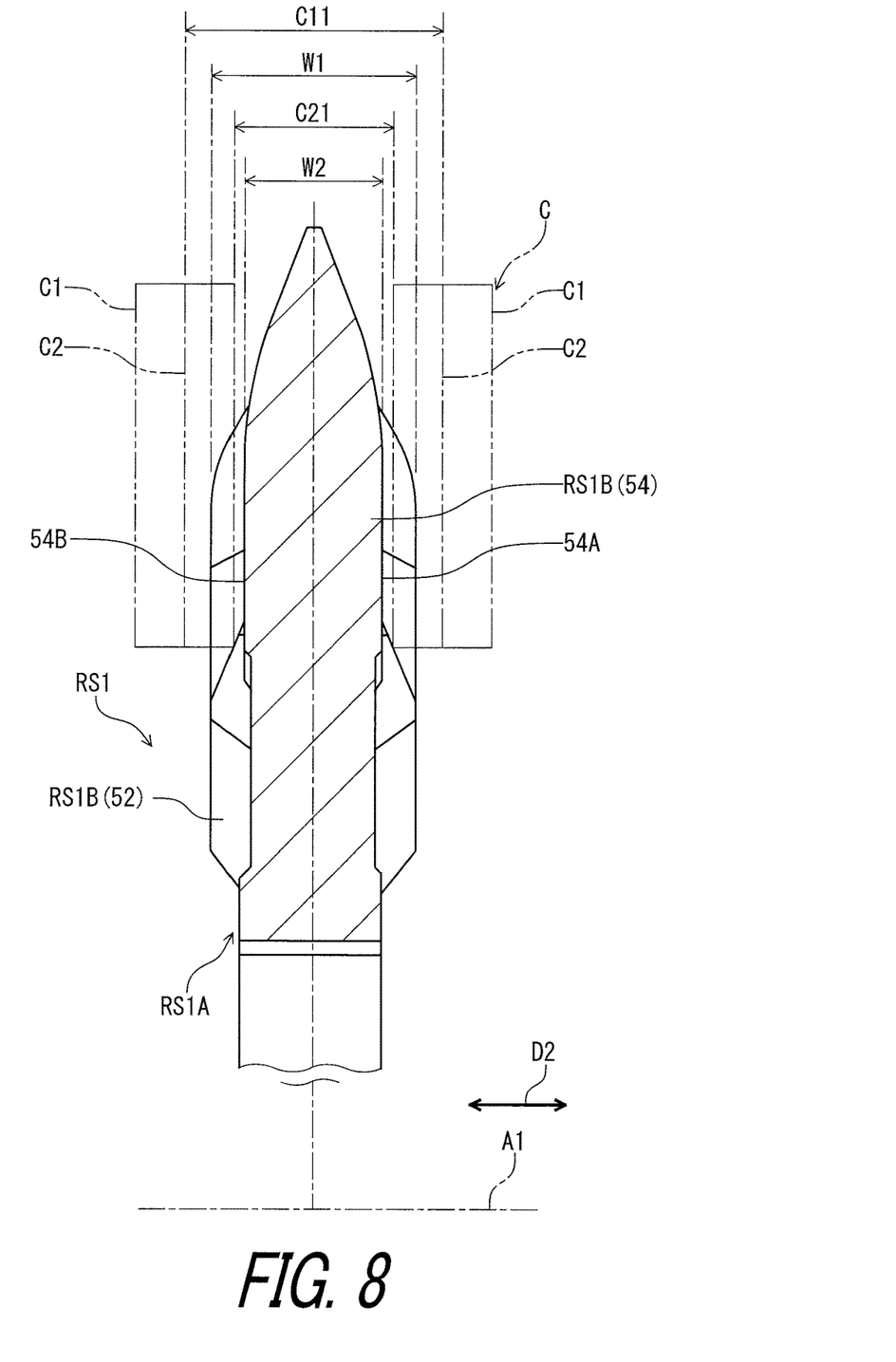
FIG. 8 is another cross-sectional view of the sprocket of the bicycle sprocket assembly illustrated in FIG. 2.

As seen in FIG. 8, the second tooth 54 extends radially outwardly from the first sprocket body RS1A to engage with an inner link space C21 defined between an opposed pair of inner link plates C2 of the bicycle chain C. The at least one second tooth 54 has a second maximum axial width W2. The first maximum axial width W1 is larger than the second maximum axial width W2. The first maximum axial width W1 is larger than an axial length of the inner link space C21. The second maximum axial width W2 is smaller than the axial length of the inner link space C21. The second tooth 54 includes a second axial surface 54A and a second additional axial surface 54B. The second additional axial surface 54B is provided on a reverse side of the second axial surface 54A in the axial direction D2. The second maximum axial width W2 extends from the second axial surface 54A to the second additional axial surface 54B in the axial direction D2. The first maximum axial width W1 can be equal to or smaller than the second maximum axial width W2.

Figure 9:
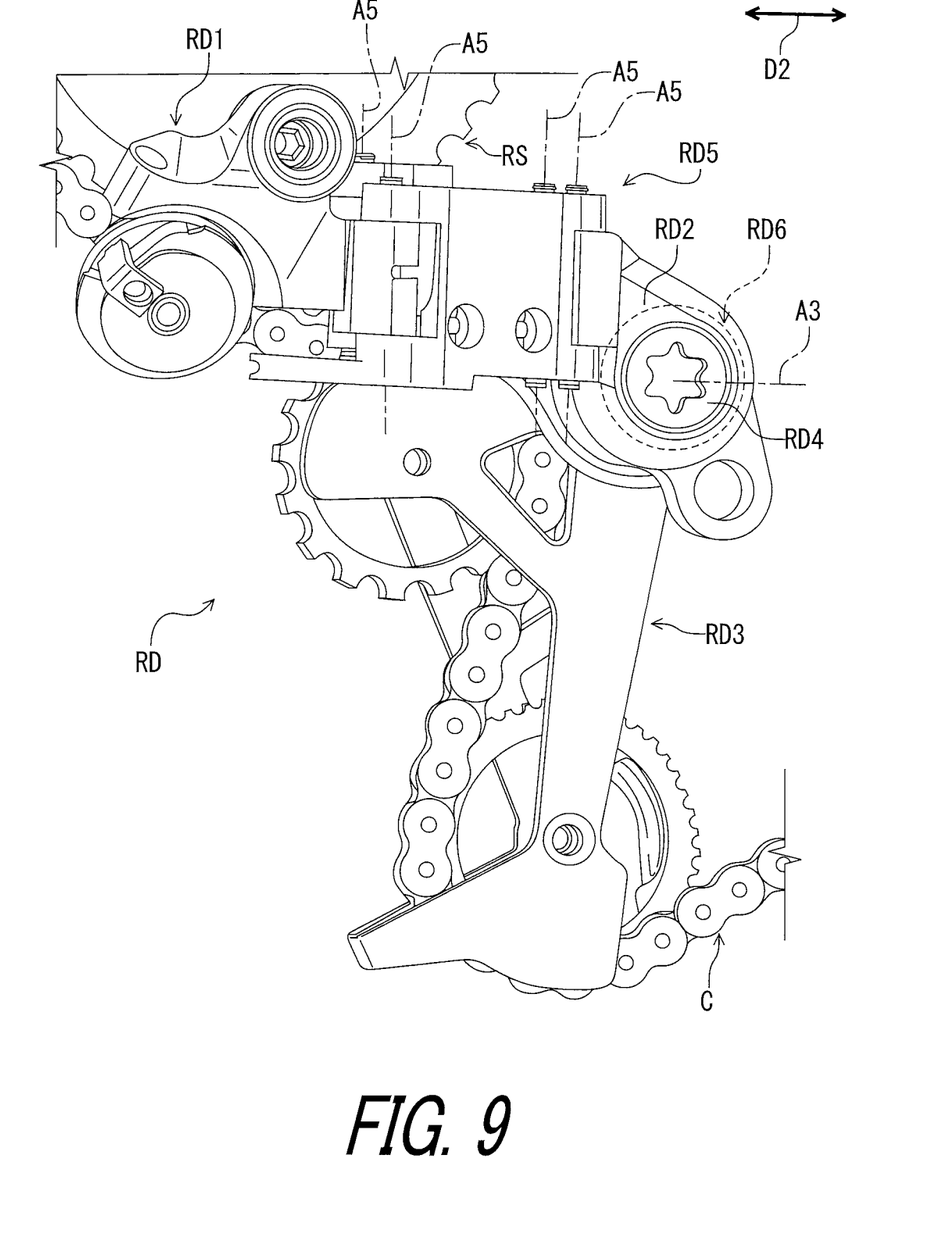
FIG. 9 is a side elevational view of a bicycle rear derailleur of the bicycle drive train illustrated in FIG. 1.

As seen in FIG. 9, the bicycle rear derailleur RD comprises a base member RD1, a movable member RD2, and a chain guide RD3. The base member RD1 is configured to be mounted to the bicycle frame B1. The movable member RD2 is movably coupled to the base member RD1. The chain guide RD3 is coupled to the movable member RD2 for rotation around a rotational axis A3 of a pivot shaft RD4.

The bicycle rear derailleur RD further comprises a linkage RD5 interconnecting the base member RD1 and the movable member RD2 to allow a movement of the movable member RD2 relative to the base member RD1. The linkage RD5 includes a linkage axis A5 oriented orthogonally to the direction (the axial direction) D2 parallel to the rotational center axis A1 of the bicycle sprocket assembly RS.

The bicycle rear derailleur RD comprises a resistance applying element RD6 to apply resistance to a rotational movement of the chain guide RD3. The resistance applying element RD6 is provided in the movable member RD2. For example, the resistance applying element RD6 includes a one-way clutch and a friction applying member. The one-way clutch applies resistance to the rotational movement of chain guide RD3 in a predetermined direction. The friction applying member applies frictional resistance to the rotational movement of chain guide RD3 by applying frictional resistance to the rotation of the one-way clutch.

The bicycle rear derailleur RD includes structures which have been known in the bicycle field. Thus, they will not be described in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
  a plurality of sprockets comprising at least twelve sprockets having different numbers of teeth, the at least twelve sprockets being coaxially arranged along a rotational center axis of the bicycle sprocket assembly, an entire gear range of the plurality of sprockets being equal to or larger than 360%, an average percentage gear stage step of the plurality of sprockets being equal to or larger than 10%, the average percentage gear stage step of the plurality of sprockets being smaller than 15%; and a hub engagement member attached to the plurality of sprockets to engage with a bicycle hub assembly, wherein a difference between a maximum value of an individual percentage gear stage step and a minimum value of the individual percentage gear stage step is larger than a half of the average percentage gear stage step, and the hub engagement member includes a surface that directly contacts an end surface of the largest sprocket, the end surface facing in a direction parallel to the rotational center axis of the bicycle sprocket assembly.

2. The bicycle sprocket assembly according to claim 1, wherein
the average percentage gear stage step of the plurality of sprockets ranges from 12% to 14%.

3. The bicycle sprocket assembly according to claim 1, wherein
the plurality of sprockets includes a first sprocket,
the first sprocket includes a first sprocket body and a plurality of first sprocket teeth extending radially outwardly from the first sprocket body,
the plurality of first sprocket teeth includes at least one first tooth and at least one second tooth,
the at least one first tooth has a first maximum axial width,
the at least one second tooth has a second maximum axial width, and
the first maximum axial width is larger than the second maximum axial width.

4. The bicycle sprocket assembly according to claim 3, wherein
the first sprocket has a first pitch circle diameter which is the largest in the plurality of sprockets.

5. The bicycle sprocket assembly according to claim 1, wherein
the plurality of sprockets includes an interior space,
the interior space includes a first end opening and a second end opening, and
the interior space extends between the first end opening and the second end opening along the rotational center axis.

6. The bicycle sprocket assembly according to claim 5, wherein
the first end opening has a first inner diameter,
the second end opening has a second inner diameter, and
the first inner diameter is larger than the second inner diameter.

7. The bicycle sprocket assembly according to claim 1, wherein
the hub engagement member includes an internal thread configured to engage with an external thread of the bicycle hub assembly.

8. The bicycle sprocket assembly according to claim 1, wherein
the plurality of sprockets includes a smallest sprocket,
the smallest sprocket has
a pitch circle diameter which is the smallest in the plurality of sprockets, and
a total number of teeth equal to or smaller than 10.

9. A bicycle drive train comprising:
a bicycle sprocket assembly comprising:
a plurality of sprockets comprising at least twelve sprockets having different numbers of teeth, the at least twelve sprockets being coaxially arranged along a rotational center axis of the bicycle sprocket assembly, an entire gear range of the plurality of sprockets being equal to or larger than 360%, an average percentage gear stage step of the plurality of sprockets being equal to or larger than 10%, the average percentage gear stage step of the plurality of sprockets being smaller than 15%; and a hub engagement member attached to the plurality of sprockets to engage with a bicycle hub assembly, and
a bicycle rear derailleur comprising:
a base member configured to be mounted to a bicycle frame;
a movable member movably coupled to the base member;
a chain guide coupled to the movable member for rotation around a rotational axis of a pivot shaft; and
a resistance applying element to apply resistance to a rotational movement of the chain guide, wherein
a difference between a maximum value of an individual percentage gear stage step and a minimum value of the individual percentage gear stage step is larger than a half of the average percentage gear stage step, and
the hub engagement member includes a surface that directly contacts an end surface of the largest sprocket, the end surface facing in a direction parallel to the rotational center axis of the bicycle sprocket assembly.

10. The bicycle drive train according to claim 9, wherein
the bicycle rear derailleur further comprises a linkage interconnecting the base member and the movable member to allow a movement of the movable member relative to the base member, and
the linkage includes a linkage axis oriented orthogonally to the direction parallel to the rotational center axis of the bicycle sprocket assembly.

11. A bicycle drive train comprising:
a bicycle rear sprocket assembly comprising:
a plurality of sprockets comprising at least twelve sprockets having different numbers of teeth, the at least twelve sprockets being coaxially arranged along a rotational center axis of the bicycle rear sprocket assembly, an entire gear range of the plurality of sprockets being equal to or larger than 360%, an average percentage gear stage step of the plurality of sprockets being equal to or larger than 10%, the average percentage gear stage step of the plurality of sprockets being smaller than 15%; and a hub engagement member attached to the plurality of sprockets to engage with a bicycle hub assembly, and
a bicycle crank assembly including a single front sprocket, wherein
a difference between a maximum value of an individual percentage gear stage step and a minimum value of the individual percentage gear stage step is larger than a half of the average percentage gear stage step, and
the hub engagement member includes a surface that directly contacts an end surface of the largest sprocket, the end surface facing in a direction parallel to the rotational center axis of the bicycle rear sprocket assembly.

12. A bicycle sprocket assembly comprising:
a plurality of sprockets comprising at least twelve sprockets having different numbers of teeth, the at least twelve sprockets being coaxially arranged along a rotational center axis of the bicycle sprocket assembly, an entire gear range of the plurality of sprockets being equal to or larger than 360%, an average percentage gear stage step of the plurality of sprockets being equal to or larger than 10%, the average percentage gear stage step of the plurality of sprockets being smaller than 15%; and a hub engagement member attached to the plurality of sprockets to engage with a bicycle hub assembly, wherein a difference between a maximum value of an individual percentage gear stage step and a minimum value of the individual percentage gear stage step is larger than a half of the average percentage gear stage step, the plurality of sprockets includes a smallest sprocket, the smallest sprocket has
- a pitch circle diameter which is the smallest in the plurality of sprockets, and
- a total number of teeth equal to or larger than 10, and the hub engagement member includes a surface that directly contacts an end surface of the largest sprocket, the end surface facing in a direction parallel to the rotational center axis of the bicycle sprocket assembly.

13. The bicycle sprocket assembly according to claim 12, wherein the plurality of sprockets includes sprockets having a total number of teeth equal to 11 teeth, 13 teeth, 15 teeth, 17 teeth, 19 teeth, 21 teeth, 24 teeth, 27 teeth, 30 teeth, 33 teeth, 36 teeth, and 40 teeth.

14. The bicycle sprocket assembly according to claim 1, wherein the entire gear range of the plurality of sprockets being equal to or smaller than 400%;

the plurality of sprockets includes a largest sprocket, and the largest sprocket has
- a pitch circle diameter which is the largest in the plurality of sprockets, and
- a total number of teeth equal to 36.

15. The bicycle drive train according to claim 9, wherein the entire gear range of the plurality of sprockets being equal to or smaller than 400%;

the plurality of sprockets includes a largest sprocket, and the largest sprocket has
- a pitch circle diameter which is the largest in the plurality of sprockets, and
- a total number of teeth equal to 36.

16. The bicycle drive train according to claim 11, wherein the entire gear range of the plurality of sprockets being equal to or smaller than 400%;

the plurality of sprockets includes a largest sprocket, and the largest sprocket has
- a pitch circle diameter which is the largest in the plurality of sprockets, and
- a total number of teeth equal to 36.

17. The bicycle sprocket assembly according to claim 12, wherein the entire gear range of the plurality of sprockets being equal to or smaller than 400%;

the plurality of sprockets includes a largest sprocket, the largest sprocket has
- a pitch circle diameter which is the largest in the plurality of sprockets, and
- a total number of teeth equal to or smaller than 40, and the total number of teeth of the smallest sprocket is equal to or larger than 11.

18. The bicycle sprocket assembly according to claim 1, wherein the surface of the hub engagement member that directly contacts the end surface of the largest sprocket faces in the direction parallel to the rotational center axis of the bicycle sprocket assembly.

19. The bicycle drive train according to claim 9, wherein the surface of the hub engagement member that directly contacts the end surface of the largest sprocket faces in the direction parallel to the rotational center axis of the bicycle sprocket assembly.

20. The bicycle drive train according to claim 11, wherein the surface of the hub engagement member that directly contacts the end surface of the largest sprocket faces in the direction parallel to the rotational center axis of the bicycle rear sprocket assembly.

21. The bicycle sprocket assembly according to claim 12, wherein the surface of the hub engagement member that directly contacts the end surface of the largest sprocket faces in the direction parallel to the rotational center axis of the bicycle sprocket assembly.

* * * * *